United States Patent [19]

Mills

[11] 4,425,872

[45] Jan. 17, 1984

[54] MILKING INFLATIONS

[76] Inventor: Geoffrey S. Mills, Walton Park, Walton, Waikato, New Zealand

[21] Appl. No.: 341,496

[22] Filed: Jan. 21, 1982

[51] Int. Cl.$^3$ ............................................. A01J 5/06
[52] U.S. Cl. ............................. 119/14.47; 119/14.52
[58] Field of Search ............... 119/14.47, 14.48, 14.49, 119/14.5, 14.51, 14.52, 14.53

[56] References Cited

U.S. PATENT DOCUMENTS

| | | | |
|---|---|---|---|
| 950,145 | 2/1910 | Shafer | 119/14.52 |
| 2,541,988 | 2/1951 | Cyphers | 119/14.52 |
| 2,687,112 | 8/1954 | Shurts | 119/14.5 |
| 2,997,980 | 8/1961 | Noorlander | 119/14.49 |
| 3,096,740 | 7/1963 | Noorlander | 119/14.52 |
| 3,158,136 | 11/1964 | George | 119/14.52 |

Primary Examiner—Hugh R. Chamblee
Attorney, Agent, or Firm—Holman & Stern

[57] ABSTRACT

A teat cup milking inflation is disclosed which is constructed from a natural or synthetic rubber material or like elastomeric plastics material and arranged for location in a rigid shell to which a pulsating vacuum/air pressure is applied for flexing of the inflation when located on an animal's teat; the main part of the inflation having a double co-axial barrel form with the upper barrel locatable on the animal's teat and the lower barrel communicating with the upper teat barrel and a lower milk outlet tube part to which suction is applied, both barrel parts being located within the rigid shell and the lower barrel part being also at least partially collapsible under the pulsating vacuum/air pressure.

8 Claims, 1 Drawing Figure

U.S. Patent        Jan. 17, 1984        4,425,872
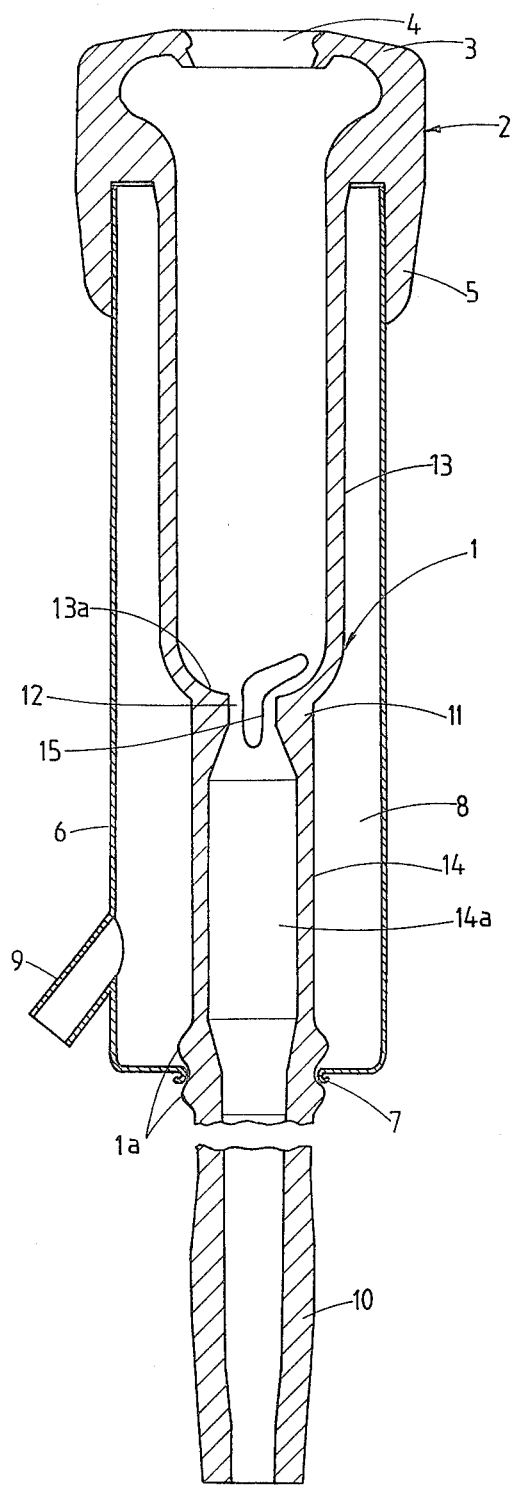

MILKING INFLATIONS

This invention relates to milking inflations for dairy milking equipment.

Various problems have existed over the years in connection with the milking of cows, and numerous forms of milking inflations and milking teat cup assemblies have been devised in an endeavour to combat such problems. One problem that does not appear to have been overcome is that of a tendency for milking inflations or teat cups to "crawl" or move lengthwise of an animal's teat due to the vacuum applied to the milk line and the pulsating action applied to the milk cup assembly, and this can cause discomfort to some animals and in particular those with shorter teats.

Accordingly it is one object of this invention to provide a milking inflation overcoming any tendency to "crawl" during milking operations.

Another continuing problem arising in dairying operations is that of mastitis developing in the cow's teats, and it is another object of this invention to provide an improved teat cup milking inflation which it is believed will assist in the prevention of mastitis in an animal.

Other and more particular objects and advantages of the invention will become apparent from the ensuing description.

According to this invention therefore there is provided a teat cup milking inflation comprising a resilient upright tubular body part arranged to be located and contained within an upright rigid tubular shell with upper and lower portions of the body part being respectively sealably engageable with upper and lower parts of the shell, an annular space being formed about the contained body part and to which a pulsating vacuum or pressure can be applied, said contained body part being divided into an upper section and a communicating lower section by an intermediate waisted portion with the upper section arranged for location about an animal's teat and having an upper collar part defining the inflation mouth, and the lower section having its lower end part connectable to a vacuum milk line.

One preferred form of the invention will now be described by way of example and with reference to the accompanying drawings, which is a longitudinal cross-sectional view of an inflation in accordance with the invention and located in a teat cup shell for milking operations.

The inflations may be constructed by any suitable means from such as a natural or synthetic rubber material or from an elastomeric vinyl plastics material such as a polyvinyl chloride or other suitable plastics material having properties desirable in the construction of milking inflations, i.e. desirable resilient qualities and qualities facilitating cleaning and sterilising of the inflation without the inflation absorbing or retaining any of the cleaning or sterilising agents which would irritate an animal or contaminate milk received from the animal.

The inflation has a resilient tubular body part 1 which merges into an upper integral head part 2 including an inwardly directed flange or collar 23 having an inner periphery defining the inflation mouth 4. The head part 2 further has an outer downwardly extending annular flange 5 spaced from the body part 1 and locatable about a teat cup shell 6 within which the inflation body part 1 is contained. The teat cup shell 6 may be of metal or any other suitable rigid material and the outer flange 5 is arranged to seal on the upper outer part of the shell 6, the shell being cylindrical in form.

The lower end portion of the body part 1 is sealably engaged with and extends through an apertured lower end portion 7 of the teat cup shell 6 and may be provided with two or more outer annular strengthening and sealing ribs 1a in the usual manner. The teat cup shell 6 is of larger diameter than the inflation body part 1 so as to provide an annular space 8 thereabout between the upper and lower sealed portions and to which pulsating vacuum/air can be applied by way of an appropriate inlet 9. A tubular extension 10 to the lower end portion of the contained body part 1 is provided for connection to a main vacuum milk line.

The invention particularly lies in the provision of a two-section or two-barrel body part contained within the teat cup shell by providing a waisted intermediate portion 11 having a passage or bore 12 connecting the upper section 13 with the lower section 14 and being strengthened by a thickening of the wall at the waisted portion and/or at the top of the lower section to prevent collapsing of the passage 12 in operation.

The upper section 13 is shaped to receive an animal's teat and is shorter in length than conventional milking inflations (a conventional teat cup shell can be utilised), and the lower outlet end of an animal's teat can (although not necessarily) abut the lower end 13a of the upper section at the waisted intermediate portion 11. The wall thickness of the lower section 14 is also preferably slightly thicker than the wall thickness of the upper teat receiving section 13 so that the upper section is more readily collapsible and flexible in use for effective milking, but the lower section 14 is still flexible and resilient and at least particularly collapsible.

The upper section 13 is thus designed to collapse around a teat during pulsation, and, for efficient application of vacuum to the lower end of the teat, the inner wall defining the bore 12 of the intermediate waisted portion 11 can be provided with at least one but preferably two or more grooves or recesses 15 facilitating communication between the upper and lower sections 13, 14, particularly for cases where the lower end of the animal's teat abuts the lower end 13a of the upper section 13.

With a variation in animal teat size, an efficient collapse of the inflation for squeezing of the animal's teat is not always possible, and accordingly the provision of a second collapsible chamber 14a in the lower section 14 of the inflation body 1 contained within the teat cup shell 6 provides a compensating effect, and a rest period during the pulsation cycle is assured and damage to the animal's teat orifice is less likely.

Further, the provision of the shortened teat engaging upper section 13 of the inflation provides a positive limit to the amount of upward travel of the inflation that can take place during milking operations, and abutment of the orifice end of the animal's teat against the lower end 13a of the inflation upper section 13 ensures that the orifice closes tightly in between milk let-down cycles determined by the pulsation rate.

A particular form of the invention has been described and illustrated by way of example, but it will be appreciated that other variations of and modifications to the invention can take place without departing from the scope of the appended claims. The present invention particularly lies in the provision of the two-section inflation body, and variations in the collar, teat cup shell engaging parts, and other parts of the inflation can take place.

I claim:

1. In a teat cup milking inflation of the type sealingly engageable within a rigid teat cup shell and adapted to receive a teat through an inflation mouth at the upper end portion and to connect with a vacuum milk line at the lower end portion, said inflation including a resilient tubular body part responsive to applied fluctuations in pressure within said shell to alternately collapse and expand around said teat, the improvement comprising a tubular body portion divided into a collapsible upper barrel section and a collapsible lower barrel section by a waisted junction section resistant to collapse having a bore communicating the upper and lower barrel sections, said waisted junction section being sufficiently smaller in diameter than said upper barrel section to function as at least a partial abutment for the distal portion of the teat to restrict upward crawl of the inflation.

2. A teat cup milking inflation as claimed in claim 1 wherein the upper section of the inflation tubular body part merges into an upper integral head part including an inwardly directed flange forming a collar part having an inner periphery defining the inflation mouth, the head part having an outer downwardly extending annular flange spaced from the body part and locatable about the upper outer part of the teat cup shell for sealing engagement therewith, the shell being cylindrical in form.

3. A teat cup milking inflation as claimed in claim 1 wherein the lower end portion of the inflation body part is sealably engaged with and extends through an apertured lower end portion of the teat cup shell, a tubular extension of said inflation lower end portion being arranged to extend below and beyond the shell for connection to a vacuum milk line.

4. A teat cup milking inflation as claimed in claim 1 wherein the inner surfaces of the walls of the body part at the lower end of the upper section and the communicating passage are provided with at least one common groove or recess.

5. A teat cup milking inflation as claimed in claim 1 wherein the length of the upper teat receiving barrel section of the body part is shorter than the length of a conventional milking inflation so that in use and operation the lower orifice end of an animal's teat abuts the inner lower end of said upper barrel section.

6. The teat cup milking inflation of claim 1, wherein the body wall defining the waisted junction section is thicker than the body walls defining the upper and lower barrel section so that the wall defining the waisted junction section resists collapse to prevent closure of said passage during said fluctuations in pressure.

7. The milking inflation of claim 1, wherein the wall of the body defining the lower barrel section is thicker than the wall defining the upper barrel section so that the lower barrel section is more resistant to collapse during pressure fluctuation than the upper barrel section.

8. The teat cup milking inflation of claim 1, wherein the inner wall defining the bore includes at least one longitudinal groove extending between the upper barrel section and the lower barrel section to facilitate communication therebetween.

* * * * *